Jan. 1, 1924.
C. K. MATTIX
DUMPING TRUCK
Filed April 21, 1922
1,479,309
3 Sheets-Sheet 1
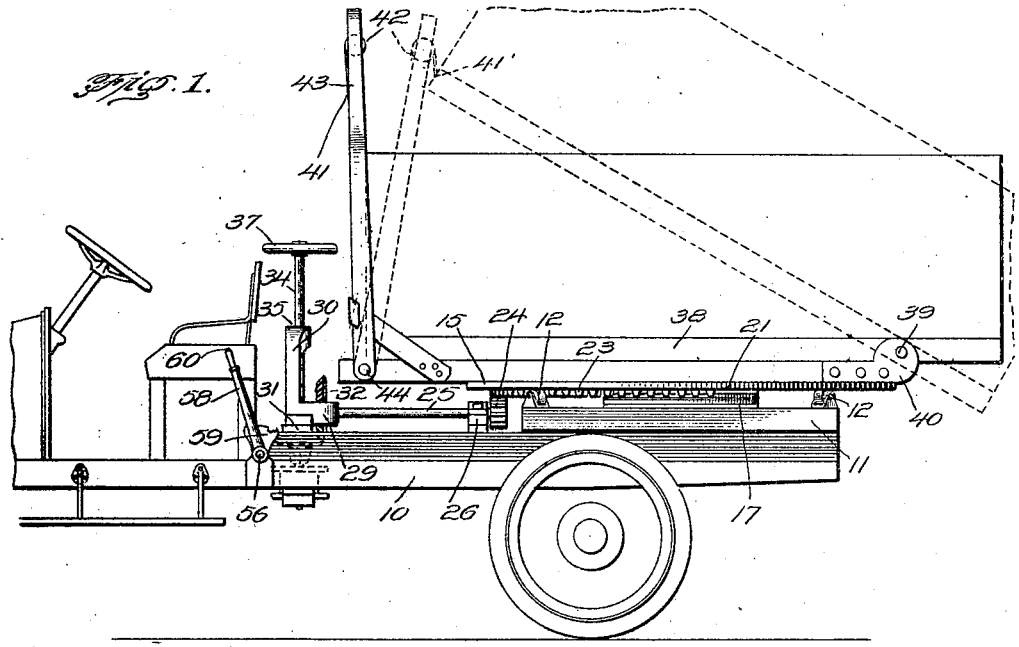
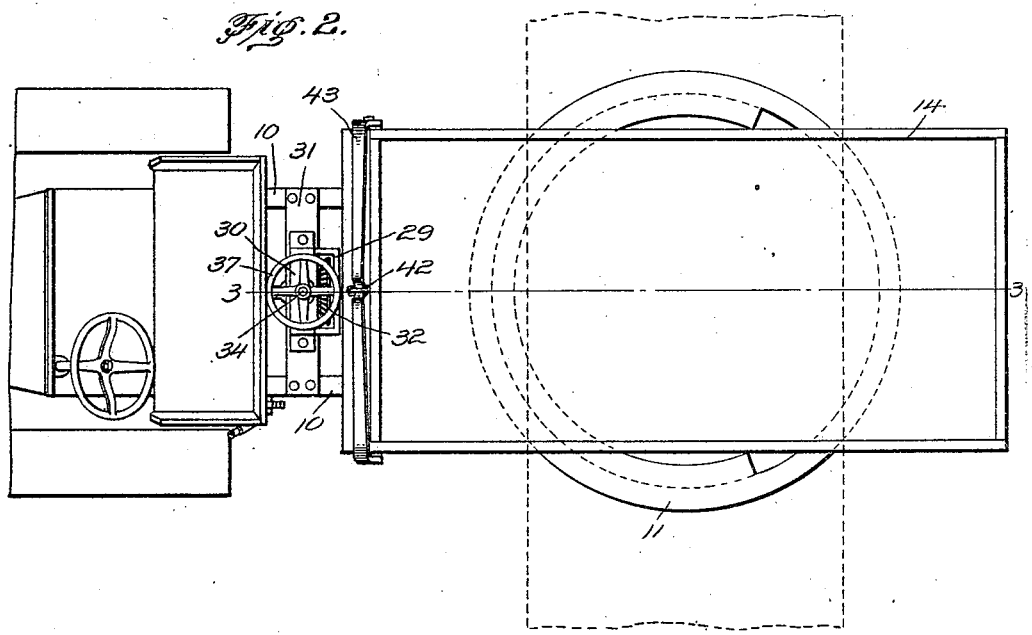
Charles K. Mattix, INVENTOR.
BY Geo. P. Kimmel
ATTORNEY.

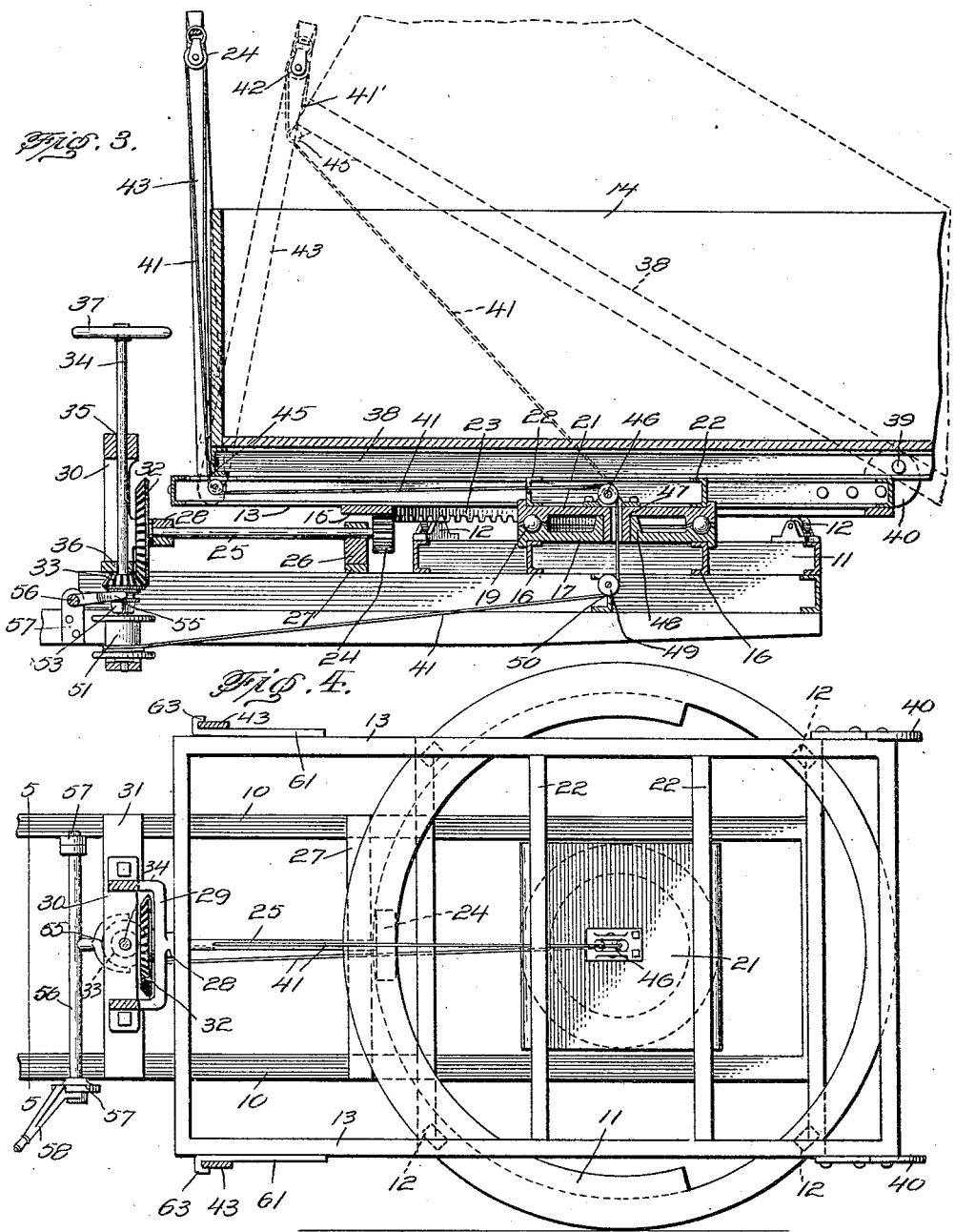

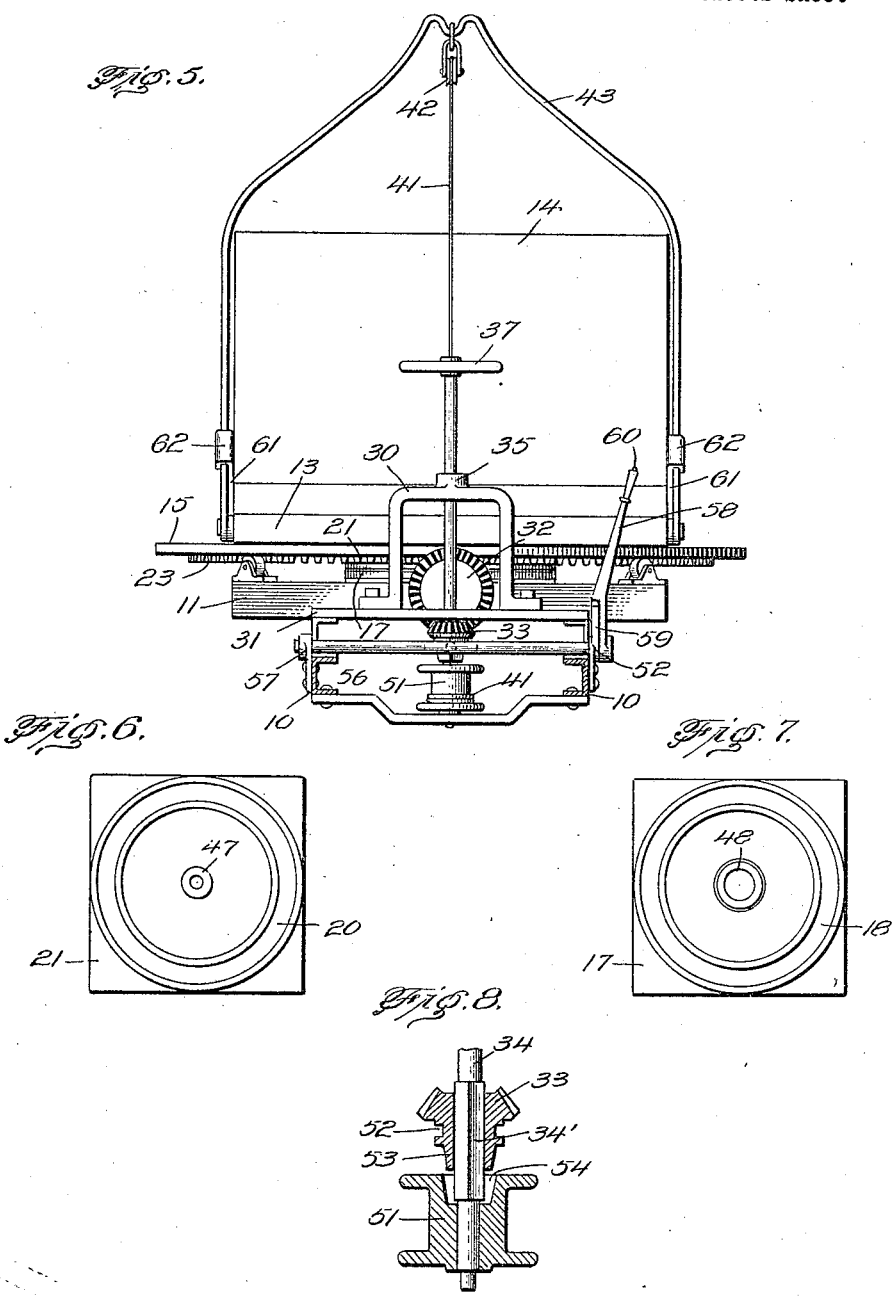

Patented Jan. 1, 1924.

1,479,309

UNITED STATES PATENT OFFICE.

CHARLES K. MATTIX, OF HUBBARD, OHIO.

DUMPING TRUCK.

Application filed April 21, 1922. Serial No. 555,829.

*To all whom it may concern:*

Be it known that I, CHARLES K. MATTIX, a citizen of the United States, residing at Hubbard, in the county of Trumbull and State of Ohio, have invented certain new and useful Improvements in Dumping Trucks, of which the following is a specification.

This invention appertains to certain improvements in dumping trucks and the like, and has for its principal object to provide for a type of the same involving a mechanically refined construction and arrangement of parts whereby to facilitate the dumping of material at points to either side of the truck chassis as well as in the usual direction rearwardly thereof.

Another object of the invention is to provide for a motor truck of the character mentioned, and one embodying a novel form of manually operated means for facilitating the dumping movements of the body thereof and in a manner as hereinbefore stated for the same.

With the foregoing and other objects in view, the invention resides in the certain novel and useful construction and arrangement of parts as will be hereinafter more fully described, set forth in the appended claims, and illustrated in the accompanying drawings, in which:—

Figure 1 is a fragmentary side elevation of a preferred embodiment of the truck, Fig. 2 is a top plan view thereof, Fig. 3 is an enlarged fragmentary vertical section taken on the line 3—3 of Fig. 2, Fig. 4 is a plan view of the truck chassis with the dumping body removed therefrom, and shows the operating means as mounted thereon for effecting the dumping movements of the body, Fig. 5 is a front view taken on the line 5—5 of Fig. 4, Fig. 6 is a plan view of the lower face of the upper part of the turn table bearing on which the dumping body and its supporting frame are mounted for movements to any of its desired dumping positions, Fig. 7 is a plan view of the upper face of the lower part of the turn table bearing, and, Fig. 8 is an enlarged detail section of the means for effecting the alternate operation of the turn table operating mechanism and the body tilting or hoisting mechanism.

Referring to the drawings, wherein similar characters of reference designate corresponding parts throughout the several views thereof, the numeral 10 indicates the oppositely disposed side bars of the chassis of a motor truck of conventional form, and mounted on the upper sides of these bars inwardly of the rear ends thereof, is a circular turn table frame 11, having a series of equidistantly spaced roller bearings 12 secured on its upper face.

Overlying the rear end portion of the chassis, is a supporting frame 13 on which is carried the dumping body 14, and secured centrally of the under side of the frame 13 is a circular plate 15 acting as a trackway for rolling engagement with the bearing rollers 12. Secured in spaced relation transversely on the upper sides of the side bars 10 of the truck chassis are a pair of cross bars 16 on which is mounted a bearing plate 17 having in its upper face a circular raceway 18 for the reception of a series of ball bearings 19, which, in turn, are engaged in a raceway 20 formed in the under face of an upper bearing plate 21 secured in position on the under faces of a pair of spaced cross bars 22 extending transversely of the under side of the body supporting frame 13. This ball bearing support of the dumping body frame 13 is disposed centrally of the trackway 15 and rearwardly with respect to the rear axle of the truck, so that the weight of the load within the body is borne directly by the latter, substantially as shown.

For the operation of the turn table in a manner to turn the supporting frame 13, and consequently the body 14, to any desired position for the dumping of the latter, the trackway 15 is formed to provide an annular rack 23 at its inner edge, and is arranged in mesh with a pinion 24 keyed on the rear end of a shaft 25. This shaft 25 is journaled at its rear end inwardly of the pinion 24 in a bearing 26 secured in position on and medially of the opposite ends of a cross bar 27 extending transversely of the chassis, and has its forward end journaled in and extending slightly through a bearing 28 formed medially of an integrally formed part 29 extending between the opposite vertical legs of an inverted substantially U-shaped bearing bracket 30, which has the lower ends of its leg portions outturned to provide apertured ears by means of which it is bolted into proper position onto the upper side of a cross bar 31 secured transversely of the chassis side bars 10. The forward end of the shaft 25 has mounted thereon, a bevelled gear 32, which is to be meshed with a smaller bevelled gear 33, carried on an operating shaft 34 journaled vertically in the bracket 30, as at 35, and in the cross bar 31, as at 36, the upper end of the operating shaft 34 being provided with a hand wheel 37 for its manipulation.

The dumping body 14 has its bottom side secured to a strengthening frame 38, and journaled transversely of this frame and in the longitudianl side bars thereof inwardly of the rear end of the same, is a pivot shaft 39, which has its oppositely projected ends engaged in brackets or ears 40 secured at the rear ends of the longitudinal side bars of the body supporting frame 13, whereby the body 14 has its rear end portions projecting for a distance beyond the rear end of the supporting frame, for dumping purposes remote from the truck, regardless of the turned position of the turn table and the supporting frame 13 carried thereby.

For hoisting and lowering the dumping body 14 to and from dumping position, a cable or rope 41 is attached to and medially of the forward end thereof as at 41′, and is trained over a pulley or sheave 42 carried at the upper end of a forked standard or hoisting frame 43, which has the lower ends of its oppositely disposed leg portions pivoted, as at 44, to the opposite outer sides of the forward end of the supporting frame 13. From the pulley or sheave 42, the cable 41 is passed rearwardly and downwardly to a pulley or sheave 45 bracketed medially on the under side of the forward transverse edge of the body frame 13, and thence rearwardly to a pulley or sheave 46 mounted on the upper side of the bearing plate 21, which is provided with a depending nipple 47 projecting into the bore of an upwardly extending nipple 48 formed on the upper face of the lower bearing 17. The cable 41 is now passed downwardly of the bore of the nipple 47 and trained in a forward direction over a pulley or sheave 49, carried on the lower side of a cross bar 50 extending transversely of the chassis side bars 10, to a winding drum 51 loosely journaled on the lower end of the operating shaft 34.

To effect the independent operation of the turn table and the body hoisting mechanisms, as thus provided, the bevelled gear 33 is slidably mounted on a squared portion 34′ of the operating shaft 34, and is provided with a depending hub portion which is formed with an annular groove 52, immediately beneath the gear portion 33, and a squared lower end portion 53 arranged to be alternately engaged in and disengaged from a squared recess 54 formed in the upper end of the winding drum 51. Engaged in the annular groove 52, the bevelled gear 33, are the oppositely curved arms of a yoke 55, which is formed with or otherwise carried by a shaft 56 journaled in bearings 57 mounted in transverse alinement on the chassis side bars 10. Mounted on one end of the shaft 56 is a hand lever 58, which is to be manipulated to rock the shaft 56 in a manner to lift the bevelled gear 33 into mesh with the bevelled gear 32, in one direction of its movement, and to lower the same from its meshing relation therewith for the engagement of the squared end 53 of the hub portion thereof into engagement with the squared recess 54 of the winding drum 51. Carried on the chassis frame is a toothed or notched segment 59, which has cooperative therewith a locking dog carried on the hand lever 58, and which is operable to and from engagement with the teeth or notches of the segment 59 by means of a push rod having its headed end 60 projecting above the upper end of the hand lever 58 on which it is mounted to lock the lever in any of its desired positions of operation.

In the operation of the truck, and assuming that the body 14 is disposed in its normal position on the chassis of the truck and has been loaded, and to effect the dumping of the load from the body directly to the rear, the hand lever 58 is manipulated to rock the shaft 56, to shift the squared end 53, of the hub of the bevelled gear 33, into the squared socket 54 of the winding drum 51, the hand wheel 37 is then rotated in a direction to wind the cable 41 on the drum 51, which will result in the hoisting of the forward end of the body 14 to the position, as shown in dotted lines in Fig. 1, when the body will be tilted on its pivot shaft 39 to full dumping position. To allow for the proper clearance of the forward end of the body 14 in its raising and lowering movements, the hoisting frame or forked standard 43 is normally inclined slightly in a forward direction, and, in the raising movement of the body 14, this frame or standard swings past the vertical in a rearward direction, whereby the entire weight of the raised end of the body is borne directly by the pulley or sheave 42, and the cable portion is shortened as the strain of the load thereon becomes greatest, all in a manner that there is practically no lateral strain or pull exerted by the load on either of the cable 41 or the frame or standard 43. However, if, instead of desiring to dump the load directly to the rear of the truck, it is desired to dump the same to one or the other side thereof, the hand lever 58 will be manipulated in a direction opposite to that in the first instance, to raise the bevelled gear 33 into mesh with the bevelled gear 32, which movement disengages the squared end 53, of the hub of the gear 33, from the recess 54 of the winding drum 51. Now, by manipulating the hand wheel 37 in the proper direction, the rotating movement of the shaft 34 and the gear 33 will be transmitted by the gear 32 to the shaft 25 and the pinion 24, which will, in turn, rotate the turn table trackway 15, and consequently the supporting frame 13 and the dumping body 14 thereon, correspondingly to swing the rear end of the latter to a predetermined dumping position at one side of the truck. Now, by again manipulating the hand lever 58 to lower the bevelled gear 33 from its meshing relation with the bevelled gear 32, the squared end 53, of the hub of the gear 33, will again engage in the recess 54 of the winding drum 51, and, upon the manipulation of the hand wheel 37, the forward end of the body 14 may be hoisted in the manner hereinbefore indicated for the same. The cable 41 will unwind from the winding drum 51, under the weight of the descending end of the body 14, which gravitates to lowered position after the load has been dumped, upon the release of the hand wheels 37 from the grasp of the operator. To brace and otherwise support the hoisting frame or standard 43 in its normally and forwardly inclined position, there is secured at the opposite sides of the supporting frame 13, a pair of brace members 61, which are angularly bent at their forwardly inclined ends, as at 62, to form seats in which the oppositely disposed legs of the frame or standard rest for the purpose.

From the foregoing, it will be readily apparent that, while a preferred embodiment of the dumping truck has been described and illustrated herein in specific terms and details of construction, arrangement and operation, various changes in and modifications of the same may be resorted to without departing from the spirit of the invention, or the scope of the claims appended hereto.

Having thus fully described the invention, what is claimed, is:—

1. A dumping truck comprising a chassis, a rotatable supporting frame supported thereby, a turn table depending from said frame, a dumping body arranged for tilting movement on said frame, a rack and pinion mechanism for effecting the operation of said turn table to position said dumping body to dump the load from either side or rearwardly of the chassis, a drum and cable mechanism for effecting the tilting of said body for dumping after said body has been shifted by the turn table, and a manually actuated operating means common to said mechanisms and including a vertically movable bevel gear for meshing engagement with the rack and pinion mechanism and for seating engagement with the drum and cable mechanism and arranged for the independent actuation of the said mechanisms.

2. A dumping truck comprising a chassis, a dumping body structure arranged over the chassis, means for rotating said structure horizontally, superposed and interengaging bearing elements secured to said structure and to the chassis, a cable cooperating with the structure and extended through said elements centrally thereof, sheeves for said cable, a winding drum for the cable having a squared seat in the top thereof, a vertically disposed shaft upon which said drum is loosely mounted, and a shiftable gear mounted on the shaft and capable of engaging the seat for coupling the drum to the shaft and further capable of meshing with said means for coupling the latter to the shaft, said gear providing means for independently operating said means and drum.

In testimony whereof, I affix my signature hereto.

CHARLES K. MATTIX.